United States Patent [19]

Sparrow

[11] Patent Number: 5,060,690
[45] Date of Patent: Oct. 29, 1991

[54] PRE-SET REGULATOR ASSEMBLY
[75] Inventor: Timothy H. Sparrow, Harrodsburg, Ky.
[73] Assignee: YKK Corporation, Lyndhurst, N.J.
[21] Appl. No.: 556,667
[22] Filed: Jul. 23, 1990
[51] Int. Cl.$^5$ ............................................. F16K 17/06
[52] U.S. Cl. .................................................. 137/540
[58] Field of Search ................................ 137/524, 540

[56] References Cited

U.S. PATENT DOCUMENTS

| | | |
|---|---|---|
| 2,070,692 | 2/1937 | Stone . |
| 2,092,572 | 9/1937 | Deane . |
| 3,550,617 | 12/1970 | Johnson ............................ 137/540 X |
| 3,593,549 | 7/1971 | Lakins . |
| 3,770,008 | 11/1973 | Turney ............................ 137/540 X |
| 3,796,074 | 3/1974 | Vik . |
| 3,964,661 | 6/1976 | Schmidt et al. . |
| 3,987,950 | 10/1976 | Schmidt et al. . |
| 4,024,740 | 5/1977 | DiGiovanni . |
| 4,336,698 | 6/1982 | Hurd . |
| 4,406,302 | 9/1983 | Olesen ............................ 137/540 X |
| 4,476,699 | 10/1984 | Dahlborg . |
| 4,490,996 | 1/1985 | Milo . |
| 4,620,428 | 11/1986 | Kopesky . |
| 4,716,747 | 1/1988 | Russo . |
| 4,881,388 | 11/1989 | Pruim . |

Primary Examiner—Robert G. Nilson
Attorney, Agent, or Firm—Hill, Van Santen, Steadman & Simpson

[57] ABSTRACT

A pressure regulator assembly having a pre-set apparatus in a selectively inaccessible location for pre-setting a minimum pressure for said pressure regulator and an adjustable mechanism for providing a selectively higher pressure. The pre-set apparatus is selectively adjustable only upon gaining entry to the selectively inaccessible location. A shield member prevents blockage of a venting port while assuring continued communication between the venting port and an area of reduced pressure, such as atmospheric pressure.

18 Claims, 3 Drawing Sheets

PRE-SET REGULATOR ASSEMBLY

The present invention to pressure regulators and more particularly to a pressure regulator which can be pre-set to a specified minimum pressure and adjusted to a second, higher pressure.

BACKGROUND OF THE INVENTION

In various mechanical devices fluid pressure such as pneumatic or hydraulic pressure is used as a motive force to operate various components of the mechanism. For example, in an apparatus for attaching fasteners such as pronged buttons to a fabric article, such as the apparatus disclosed in U.S. Pat. Nos. 3,964,661 and 3,987,950, a pneumatic cylinder is used to assemble two components of the fastener element on to a fabric article. The pressure supplied by the cylinder is critical in assembling the two portions of the fastener together in that if too low of a pressure is utilized, the parts will not be completely assembled and thus will be more subject to failure. If too high of a pressure is utilized then the parts will be subject to damage.

It is necessary during the operation of the apparatus, however, to adjust the pressure of the cylinder as needed in order to compensate for various factors encountered in the manufacturing process. On commercially available devices, a pressure regulator is provided in which there is an adjustment mechanism, generally in the form of a threaded member which can be moved axially within the pressure regulator body to provide the necessary adjustment. However operators may inadvertently select a pressure which is below a necessary minimum pressure to achieve an adequate assembly of the parts. Therefore, it would be advantageous if there were provided a pressure regulator which could be pre-set to provide a minimum pressure and which could be adjustable to provide a preselected range of pressures above the pre-set minimum pressure.

Another feature of pressure regulators generally is to have a vent or bleed hole which is necessary to prevent an excessive amount of pressure and to accurately maintain the pressure selected through adjustment of the pressure regulator. Again, operators may inadvertently or purposefully block the vent hole to cause the apparatus, in some instances, to operate faster, but in any event, to subvert the functioning of the pressure regulator. Therefore, it would be an improvement to the art to assure proper venting of the pressure regulator while avoiding inadvertent or purposeful blocking.

SUMMARY OF THE INVENTION

The present invention provides a pressure regulator in which a minimum pressure can be pre-set and yet which is adjustable within a range of pressures above the pre-set minimum pressure. The present invention also provides a shield member which assures proper venting of the vent opening yet shields the vent opening against most inadvertent or purposeful blocking.

To provide the pre-set minimum, yet adjustable, pressure, there are provided two separate axially movable members which each can be independently adjusted, axially moving a valve member, to affect the pressure in a line to which the regulator is attached. A first of the adjustable members is used to pre-set a minimum pressure and it is positioned within the body of the pressure regulator such that it is accessible only through a complete disassembly of the pressure regulator requiring special tools. Thus, in most instances, the pre-set minimum adjustment will be fixed and the operator will have access only to the adjustment member which can be used to select a pressure above the pre-set minimum.

A shield member, in the form of a cylindrical sleeve, is carried on the pressure regulator body to overlie the vent opening. The wall of the pressure regulator body where the vent opening exits through the wall is milled or otherwise shaped so as to form a channel between the pressure regulator body and the cylindrical sleeve leading to an appropriate lower pressure zone, such as atmosphere.

DESCRIPTION OF THE PREFERRED EMBODIMENTS

As described above, there are many different devices which are powered through the use of pressurized fluid such as hydraulic or pneumatic cylinders. In such devices it oftentimes is useful to provide a mechanism for regulating the fluid pressure.

The present invention provides an improvement to a pressure regulator and although the present invention is not limited to a particular configuration or use, a specific embodiment and use is disclosed herein in order to provide a clear description of the invention.

Figure 1:
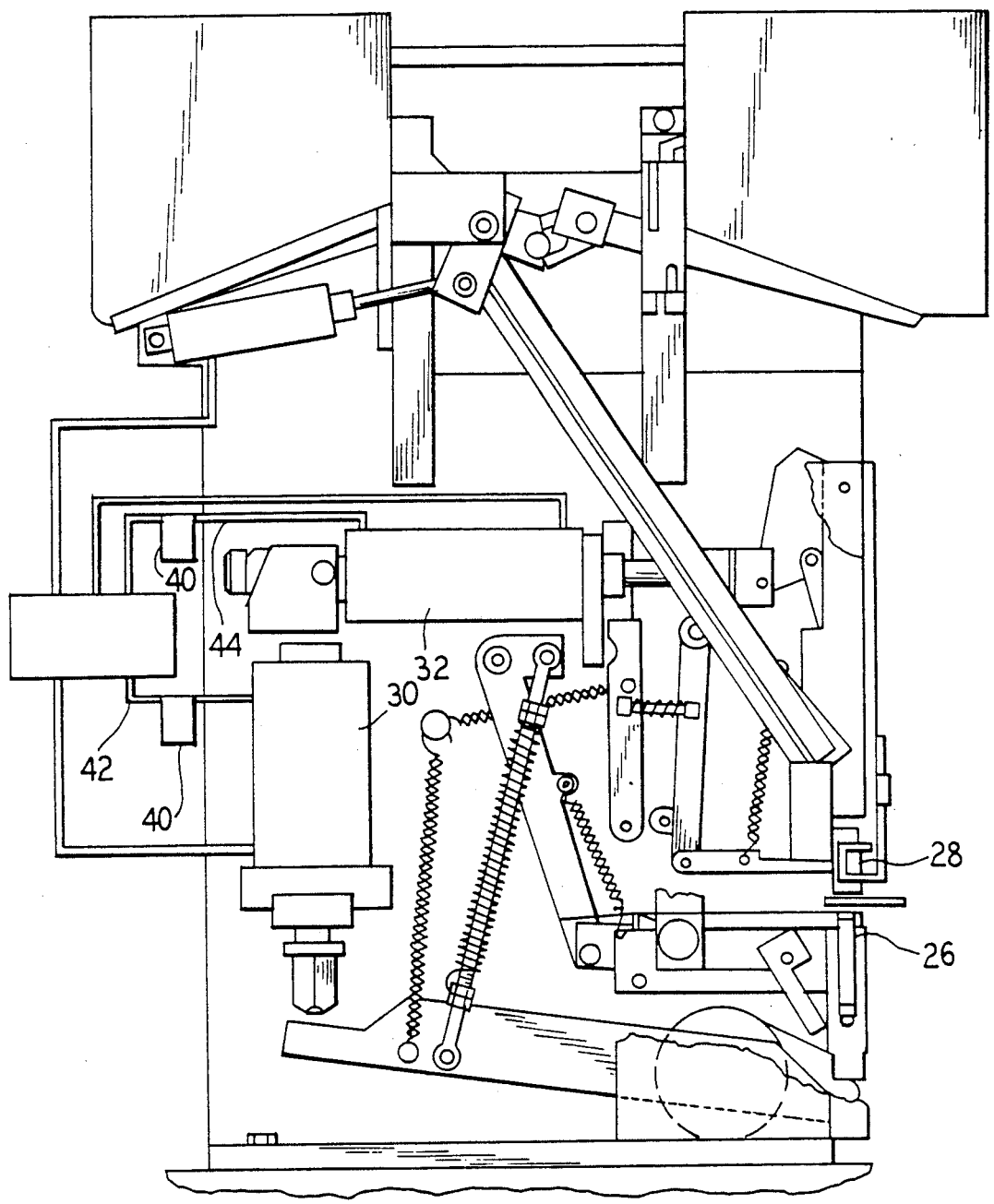
FIG. 1 is a side elevational view of an apparatus for attaching elements to an article in which the pressure regulator of the present invention would be useful.

A particular use in which the present invention finds utility is in regulating the pneumatic pressure in an apparatus which attaches a fastener, such as a button to an article such as a clothing article. Such an apparatus is illustrated generally in FIG. 1 and is described in detail in U.S. Pat. No. 3,987,950, which patent is incorporated herein by reference.

Figure 5:
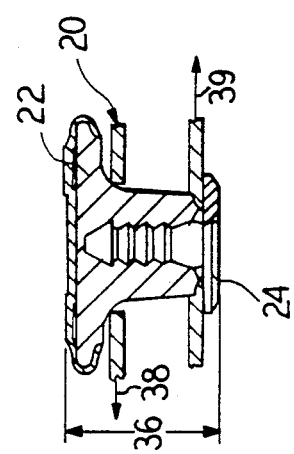
FIG. 5 is a side sectional view of an assembled fastener which can be assembled in an apparatus utilizing a pressure regulator of the present invention.

In such an apparatus, a fastener 20 (FIG. 5) comprised of two pieces 22, 24 is assembled by rams 26, 28 (FIG. 1) which are driven by air cylinders 30, 32 respectively. The two pieces 22, 24 are pressed together to achieve a "set height" 36 which is a function of the attachment force generated by the rams 26, 28. The force generated by the rams 26, 28, in turn, is dependent upon the fluid pressure being applied to cylinders 30, 32.

Figure 4:
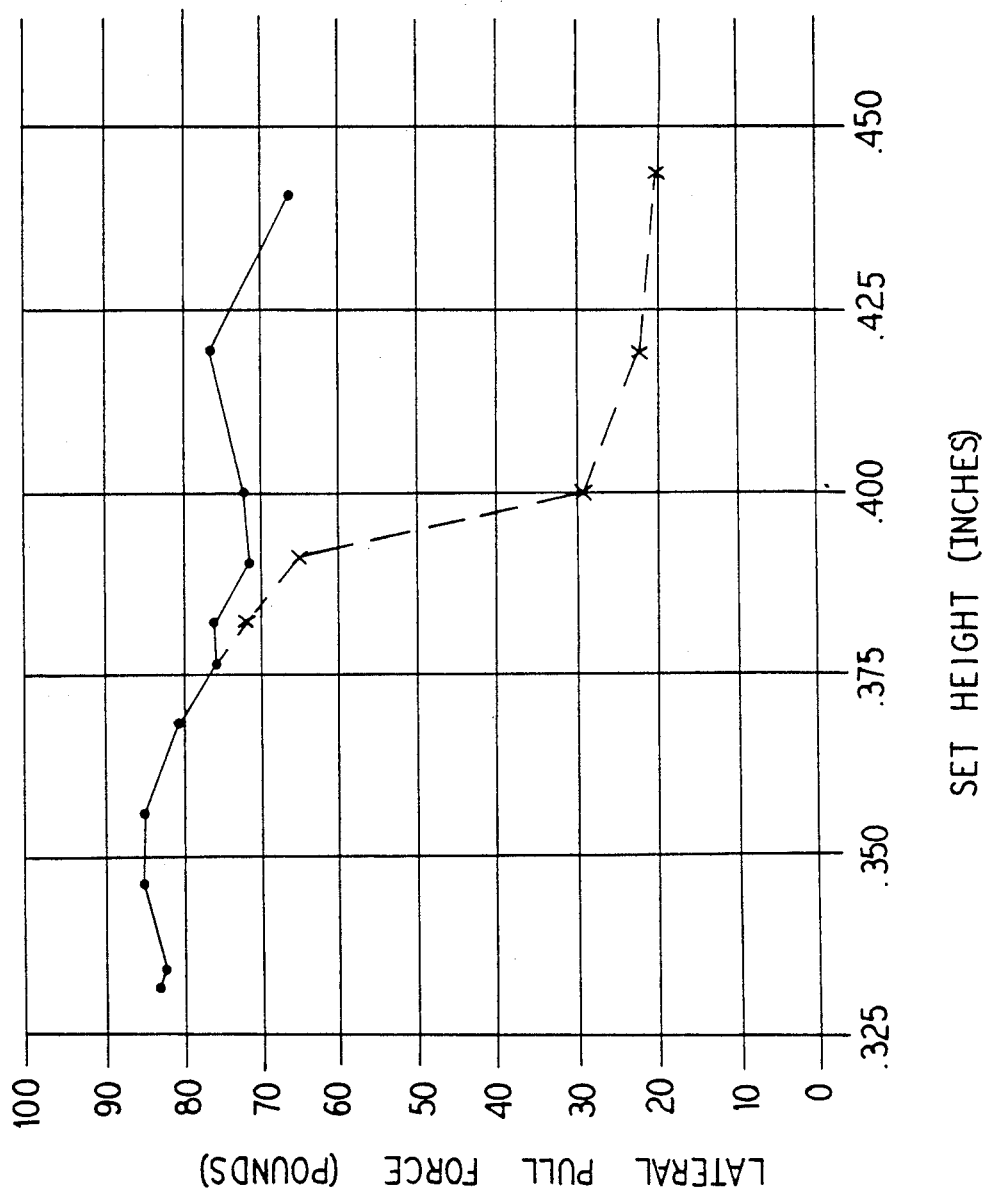
FIG. 4 is a graphic illustration of the strength of an assembled fastener as a function of "set height".

As shown in FIG. 4, the set height is critical in maintaining the assembly of the fastener pieces 22, 24. For example, a set height in the range of 0.325 to 0.36 inches results in a failure of the fastener (separation of the two pieces 22, 24) at a lateral pull force (indicated by arrows 38, 39 in FIG. 5) of an amount in excess of 80 lbs. At a set height greater than 0.375 inches, failures (solid lines) begin at a force somewhat less than 80 lbs. and slippage between the parts (shown by dashed lines in FIG. 4) begins at a much lower force. Thus, it is critical to maintain a certain minimum fluid pressure level in order to provide a minimum force by the rams 26, 28 to assure that the "set height" is not greater than a preselected maximum height.

A fluid pressure far in excess of that required for the preselected "set height" 36 could cause damage to the fastener 20 by driving the parts farther into each other than desired. However, it is desirable to provide a means for adjusting the fluid pressure within a preselected range of pressures in order to accommodate variances encountered in the manufacturing process. Therefore, it is common to provide adjustable pressure regulators in the fluid lines powering the cylinders.

Figure 2:
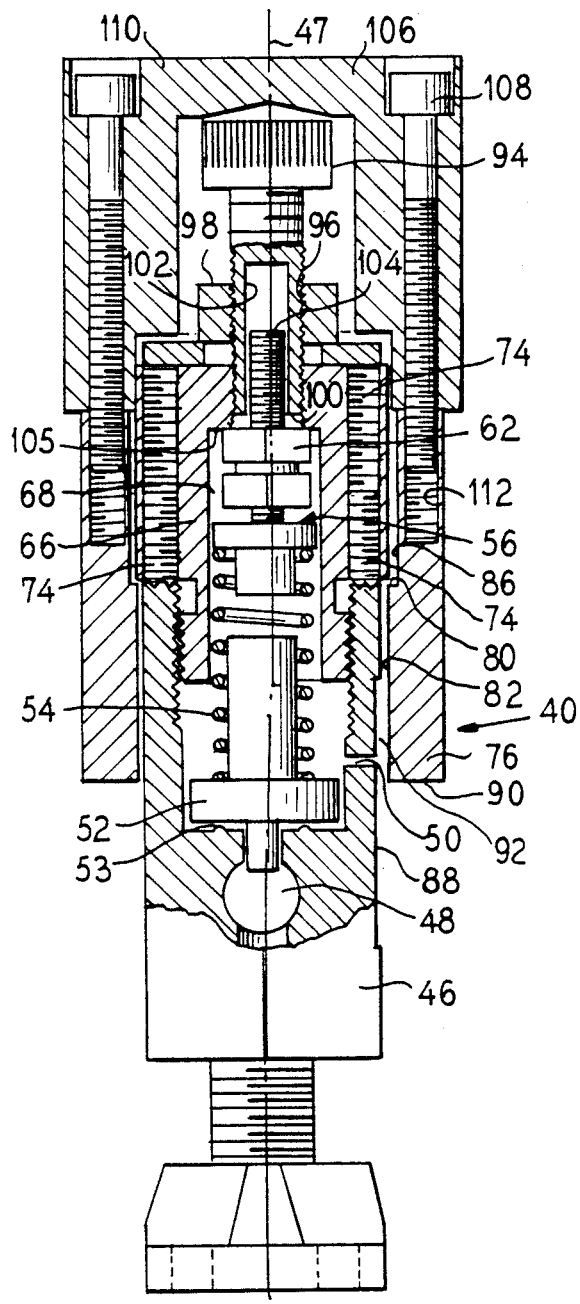
FIG. 2 is a partial sectional view through the assembled pressure regulator of the present invention.
Figure 3:
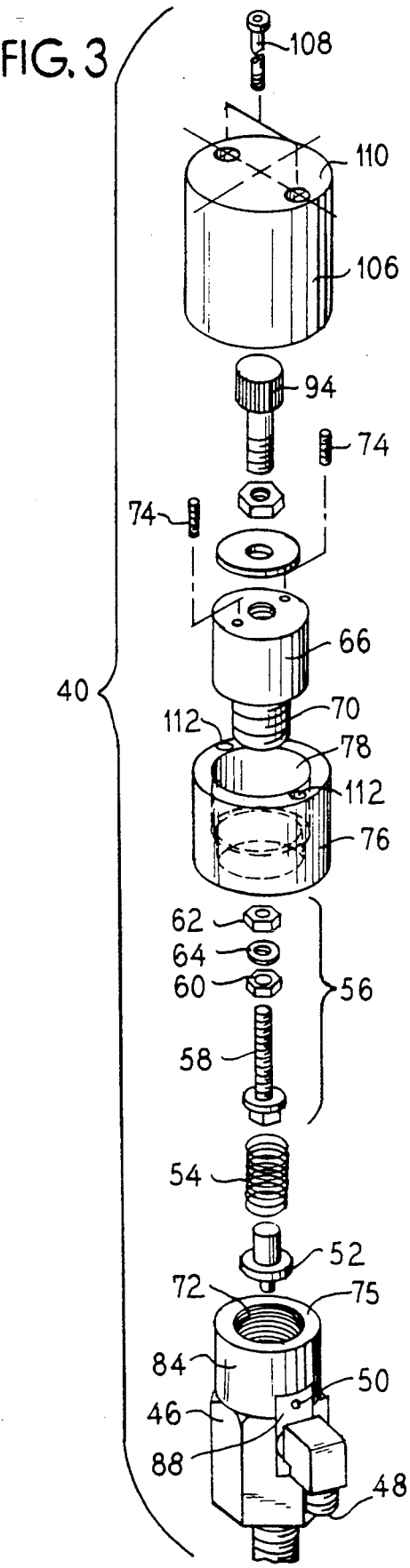
FIG. 3 is an exploded view of the parts of the pressure regulator assembly.

The present invention provides an improved pressure regulator 40 which can be attached to the fluid lines 42, 44 powering the fluid cylinders 30, 32. The improved pressure regulator is shown in detail in FIGS. 2 and 3. In those figures there is illustrated the pressure regulator assembly 40 which has a base member 46 having a generally cylindrical configuration defining a longitudinal axis 47, having a first port 48 communicating with a source of pressurized fluid (such as one of lines 42 or 44) and a second port 50 communicating with a fluid at a relatively lower pressure, such as atmosphere. A valve member 52 is positioned within the base member 46 between port 48 and port 50. The valve member is axially movable in the base member 46 toward and away from a valve seat 53 formed at the first port 48 to regulate a flow of the pressurized fluid from the first port 48 to the second port 50, and thus the pressure at the second port 50. A biasing means 54 in the form of a coil spring, urges the valve member 52 toward the first port 48 against the flow of the pressurized fluid to prevent the flow of fluid toward the second and third ports 50 and 51 until a certain pressure level is achieved. Pre-set means 56 in the form of a threaded screw 58 carrying a pair of nuts 60, 62 separated by a washer 64 is provided for setting a predetermined biasing pressure limiting axial movement of the valve member 52 away from the first port 48. A generally cylindrical block member 66 has a hollow interior 68 which receives the pre-set means 56. The block member 66 has a threaded first end 70 which mates with a threaded opening 72 in the base member 46 such that the block member 66 can be co-axially attached to the base member 46. A pair of set screws 74 can be driven through the block member 66 to engage a top face 75 of the base member 46 to prevent removal of the block member 66 without the use of a special tool to unscrew the set screws 74. Thus, the pre-set means is located in a selectively inaccessible location in the base member.

A shield means 76 in the form of a cylindrical sleeve is captured on the base member 46 and has a stepped cylindrical passage 78 such that a shoulder 80 is formed therein which faces away from the base member 46. A smaller diameter portion 82 of the passage 78 surrounds a cylindrical outer surface 84 of the base member. A larger diameter portion 86 of the passage 78 surrounds the block member 66. The smaller diameter passage 82, however, is smaller than a diameter of the block member 66, thus the shield means 76 is captured on the assembly and is prevented from being removed therefrom without removal of the block member 66.

The base member 46 has a flat area 88 machined or formed therein in an area surrounding the second port 50. A lower end 90 of the shield means 76 extends below the second port 50 thus preventing direct access to the second port. However, the flat area 88 and the interior of the shield means 76 define a passage 92 which allows communication between the second part and fluid at a lower pressure such as ambient atmosphere.

An adjustable means 94 in the form of a threaded screw is adjustably received in a threaded opening 96 in an end 98 of the block member 66. A threaded end 100 of the adjustable screw 94 has a blind passage 102 formed therein for receipt of a protruding end 104 of smaller screw 58 of the pre-set means. When the adjustment screw 94 is advanced sufficiently, the end 100 will engage the nut 62 thus moving the pre-set means 56 axially toward the valve member 52 thus causing the valve member 52 to move axially toward the valve seat 53 and the first port 48 thereby increase the pressure required to lift valve member 52 off of valve seat 53.

When the adjustable screw 94 is backed away from the pre-set means 56, the pre-set means 56 will move axially away from the first port 48 thus permitting the valve required to lift valve member 52 off of valve seat 53. Movement of the pre-set means is stopped by the nut 62 engaging a shoulder 105 on the block member 66. Thus, a pre-set minimum pressure will be maintained for lifting the valve member 52 off of the valve seat 53 regardless of the position of the adjustable screw 94. This pre-set minimum pressure can be adjustably selected by varying the length of the pre-set means 56 by selective positioning of the nut 62 on the threaded screw 58.

To prevent inadvertent movement of the adjustable screw 94 an outer cap 106 is secured on the pressure regulator assembly 40 by means of a pair of threaded fasteners 108 which extend through a top wall 110 of the cap 106 and engage into threaded passages 112 in the shield means 76.

The operator of the mechanism utilizing the pressure regulator assembly 40 would be provided with a tool to remove the screws 108 to provide relatively easy access to the adjustable screw 94 such that the operator can adjust the pressure at port 48 anywhere from the preselected minimum pressure up through a pre-selected range of pressures to a higher pressure.

The operator would not be given a tool to remove the set screws 74. Thus, the pre-set means will be relatively inaccessible to the operator. Of course, the pre-set means can be selectively accessed to permit occasional adjustment of the minimum pressure assured by the pre-set means as required.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A pressure regulator assembly comprising:
   a base member having a first port communicating with a source of pressurized fluid and a second port communicating with fluid at a relatively lower pressure;
   a valve member positioned in said base member between said two ports, said valve member being movable in said base member to regulate a flow of said pressurized fluid from said first port to said second port;
   biasing means for urging said valve member towards said first port at a biasing pressure against said pressurized fluid to prevent said flow of fluid towards said second port when said pressurized fluid is below a predetermined pressure;

adjustable pre-set means for setting a predetermined biasing pressure for limiting movement of said valve member away from said first port, said preset means being located in a selectively inaccessible location in said base member;

shield means for blocking direct access to said second port from the exterior of said base member, yet maintaining communication between said port and said relatively lower pressure fluid; and adjustable means for selectively varying said predetermined biasing pressure against said valve member toward said first port.

2. A pressure regulator assembly according to claim 1, wherein said base member has a valve seat formed therein adjacent to said first port, said biasing means urging said valve member towards said valve seat.

3. A pressure regulator assembly according to claim 1, wherein said biassing means comprises a coil spring positioned between said valve member and said pre-set means.

4. A pressure regulator assembly according to claim 1, wherein said pre-set means comprises a threaded member which can be pre-set to a predetermined position relative to said valve member.

5. A pressure regulator assembly according to claim 1, wherein said shield means comprises a cylindrical cap covering a portion of said base member including said second port, an exterior wall of said base member and an interior of said cap being configured to provide a communicating passage between said second port and said relatively lower pressure fluid.

6. A pressure regulator assembly according to claim 1, wherein said adjustable means comprises a threaded member selectively movable toward and away from said valve member.

7. A pressure regulator assembly according to claim 1, including means for gaining access to said preset means, said preset means being adjustable from its predetermined position.

8. A pressure regulator assembly comprising:

a generally cylindrical base member having a central axis, a first axial port communicating with a source of pressurized fluid and a second radial port communicating with fluid at a relatively lower pressure;

a valve member positioned in said base member between said two ports, said valve member being axially movable in said base member to regulate a flow of said pressurized fluid from said first port to said second port;

an axially compressible spring carried in said base member for urging said valve member towards said first port against said flow of said pressurized fluid to reduce said flow of fluid towards said second port;

adjustable pre-set means for limiting movement of said valve member away from said first port, said preset means being inaccessibly located in said base member;

shield means for blocking direct access to said second port from the exterior of said base member, yet maintaining communication between said port and said relatively lower pressure fluid; and axially adjustable means for varying a biasing pressure against said valve member toward said first port.

9. A pressure regulator assembly according to claim 8, wherein said base member has a valve seat formed therein adjacent to said first port, said spring urging said valve member towards said valve seat.

10. A pressure regulator assembly according to claim 8, wherein said spring comprises a coil spring positioned between said valve member and said pre-set means.

11. A pressure regulator assembly according to claim 8, wherein said pre-set means comprises a threaded member which can be pre-set to a predetermined axial position relative to said valve member.

12. A pressure regulator assembly according to claim 8, wherein said shield means comprises a cylindrical cap covering a portion of said base member including said second port, an exterior wall of said base member and an interior of said cap being configured to provide a communicating passage between said second port and said relatively lower pressure fluid.

13. A pressure regulator assembly according to claim 8, wherein said adjustable means comprises a threaded member selectively movable toward and away from said valve member.

14. A pressure regulator assembly according to claim 8, wherein said pre-set means is axially adjustable.

15. A pressure regulator assembly comprising:

a generally cylindrical base member having a central axis, a first axial port communicating with a source of pressurized fluid and a second radial port communicating with fluid at a relatively lower pressure, a valve seat being formed adjacent to said first port;

a valve member positioned in said base member between said two ports, said valve member being axially movable in said base member to regulate a flow of said pressurized fluid from said first port to said second port;

pre-set means for limiting movement of said valve member away from said first port, said preset means being inaccessibly located in said base member;

an axially compressible coil spring carried in said base member between said pre-set means and said valve member for urging said valve member towards said valve seat against said flow of said pressurized fluid to reduce said flow of fluid towards said second port;

shield means for blocking direct access to said second port from the exterior of said base member, yet maintaining communication between said port and said relatively lower pressure fluid; and a threaded member selectively axially movable for varying a biasing pressure against said valve member toward said first port.

16. A pressure regulator assembly according to claim 15, wherein said preset means comprises a threaded member which can be pre-set to a predetermined axial position relative to said valve member.

17. A pressure regulator assembly according to claim 15, wherein said shield means comprises a cylindrical cap covering a portion of said base member including said second port, an exterior wall of said base member and an interior of said cap being configured to provide a communicating passage between said second port and said relatively lower pressure fluid.

18. A pressure regulator assembly according to claim 15, wherein said preset means is axially adjustable.

* * * * *